United States Patent [19]
Yuasa et al.

[11] Patent Number: 5,386,301
[45] Date of Patent: Jan. 31, 1995

[54] APPARATUS FOR PRODUCING A BILEVEL IMAGE SUITABLE FOR A PRINTING CHARACTERISTIC OF A PRINTING UNIT

[75] Inventors: Kazuhiro Yuasa, Zama; Kazumasa Koike, Atsugi, both of Japan

[73] Assignee: Ricoh Company, Ltd., Tokyo, Japan

[21] Appl. No.: 108,503

[22] Filed: Aug. 18, 1993

[30] Foreign Application Priority Data

Aug. 21, 1992 [JP] Japan ................. 4-243991

[51] Int. Cl.$^6$ ............................................. H04N 1/40
[52] U.S. Cl. ................... 358/445; 358/444; 358/448; 358/455; 358/465; 358/296
[58] Field of Search ............ 358/448, 466, 460, 455, 358/465, 445, 447, 463, 457, 296, 401, 501, 523; 382/50, 54

[56] References Cited

U.S. PATENT DOCUMENTS

| | | | |
|---|---|---|---|
| 5,006,938 | 4/1991 | Mita | 358/455 |
| 5,067,027 | 11/1991 | Yano | 358/445 |
| 5,077,615 | 12/1991 | Tsuji | 358/456 |
| 5,097,520 | 3/1992 | Bessho et al. | 382/50 |
| 5,150,428 | 9/1992 | Leone et al. | 382/50 |
| 5,177,623 | 1/1993 | Hirota | 358/455 |
| 5,243,445 | 9/1993 | Koike | 358/460 |
| 5,259,042 | 11/1993 | Matsuki et al. | 382/50 |
| 5,289,294 | 2/1994 | Fujisawa | 358/463 |

FOREIGN PATENT DOCUMENTS 62-239666 10/1987 Japan.

*Primary Examiner*—Edward L. Coles, Sr.
*Assistant Examiner*—Fan Lee
*Attorney, Agent, or Firm*—Popham, Haik, Schnobrich & Kaufman, Ltd.

[57] ABSTRACT

An image processing apparatus includes a reading part for reading an image by raster scanning of a document and for producing a multilevel image data relating to one pixel of the image, a memory part for storing a plurality of predetermined weight matrix patterns, each weight matrix pattern having N×N weight coefficients arranged in an N×N formation, a selecting part for selecting one of the plurality of predetermined weight matrix patterns based on a printing characteristic of a printing unit that prints a bi-level processed image, a processing part for adding a weight coefficient read from the selected weight matrix pattern to the multilevel image data relating to one pixel from the reading part so that a weighted multilevel image data is produced, and a binarizing part for processing the weighted multilevel image data by using a binarizing process based on an error scattering method to produce a bi-level signal relating to one dot of a processed image, and for supplying the bi-level signal to the printing unit to print the processed image.

26 Claims, 7 Drawing Sheets

MT1

| 2 | 6 | -6 | -10 |
|---|---|----|-----|
| 14 | 10 | -14 | -2 |
| -6 | -10 | 2 | 6 |
| -14 | -2 | 14 | 10 |

MT2

| 1 | 3 | -3 | -5 |
|---|---|----|-----|
| 7 | 5 | -7 | -1 |
| -3 | -5 | 1 | 3 |
| -7 | -1 | 7 | 5 |

MT3

| -14 | -2 | -10 | -14 |
|-----|----|----|-----|
| -2 | 10 | 10 | -6 |
| 6 | 14 | 14 | 2 |
| -10 | 6 | 2 | -6 |

MT4

| -7 | -1 | -5 | -7 |
|----|----|----|-----|
| -1 | 5 | 5 | -3 |
| 3 | 7 | 7 | 1 |
| -5 | 3 | 1 | -3 |

FIG. 3A

| -10 | 2 | 6 | -6 | -10 | 2 | 6 | -6 | -10 |
|---|---|---|---|---|---|---|---|---|
| -2 | 14 | 10 | -14 | -2 | 14 | 10 | -14 | -2 |
| 6 | -6 | -10 | 2 | 6 | -6 | -10 | 2 | 6 |
| 10 | -14 | -2 | 14 | 10 | -14 | -2 | 14 | 10 |

| 5 | 1 | 3 | -3 | 5 | 1 | 3 | -3 | 5 |
|---|---|---|---|---|---|---|---|---|
| -1 | 7 | 5 | -7 | -1 | 7 | 5 | -7 | -1 |
| 3 | -3 | -5 | 1 | 3 | -3 | -5 | 1 | 3 |
| 5 | -7 | -1 | 7 | 5 | -7 | -1 | 7 | 5 |

| -11 | -2 | -8 | -11 |
|---|---|---|---|
| -2 | 8 | 8 | -5 |
| 5 | 11 | 11 | 3 |
| -8 | 5 | 2 | -5 |

| 34 | 38 | 26 | 22 |
|----|----|----|----|
| 46 | 42 | 26 | 22 |
| 26 | 22 | 34 | 38 |
| 26 | 22 | 46 | 42 |

FIG. 7B MR2

| 33 | 35 | 29 | 27 |
|----|----|----|----|
| 39 | 37 | 25 | 31 |
| 29 | 27 | 33 | 35 |
| 25 | 31 | 39 | 37 |

FIG. 7C MR3

| 18 | 30 | 22 | 18 |
|----|----|----|----|
| 30 | 42 | 42 | 26 |
| 38 | 46 | 46 | 34 |
| 22 | 38 | 34 | 26 |

FIG. 7D MR4

| 25 | 31 | 27 | 25 |
|----|----|----|----|
| 31 | 37 | 37 | 29 |
| 35 | 39 | 39 | 33 |
| 27 | 35 | 33 | 29 |

FIG. 8A RA

| 22 | 34 | 38 | 26 | 22 | 34 | 38 | 26 | 22 |
|----|----|----|----|----|----|----|----|----|
| 22 | 46 | 42 | 26 | 22 | 46 | 42 | 26 | 22 |
| 38 | 26 | 22 | 34 | 38 | 26 | 22 | 34 | 38 |
| 42 | 26 | 22 | 46 | 42 | 26 | 22 | 46 | 42 |

FIG. 8B RA

| 27 | 33 | 35 | 29 | 27 | 33 | 35 | 29 | 27 |
|----|----|----|----|----|----|----|----|----|
| 31 | 39 | 37 | 25 | 31 | 39 | 37 | 25 | 31 |
| 35 | 29 | 27 | 33 | 35 | 29 | 27 | 33 | 35 |
| 25 | 25 | 31 | 39 | 25 | 25 | 31 | 39 | 25 |

| 22 | 31 | 25 | 22 |
|----|----|----|----|
| 31 | 40 | 40 | 28 |
| 37 | 43 | 43 | 34 |
| 25 | 37 | 34 | 28 |

APPARATUS FOR PRODUCING A BILEVEL IMAGE SUITABLE FOR A PRINTING CHARACTERISTIC OF A PRINTING UNIT

BACKGROUND OF THE INVENTION

The present invention generally relates to an image processing apparatus, and more particularly to an image processing apparatus for processing a multilevel image data of an image by using a binarizing process based on an error scattering method to produce a bi-level processed image suitable for a predetermined printing characteristic of a printing unit that prints the bi-level processed image.

In facsimile machines, a multilevel image data of an image is produced by reading the image from a document, and the multilevel image data is processed by using a binarizing process to produce a bi-level signal. The bi-level signal is stored in a memory, and it is transmitted, received and recorded by a facsimile machine.

Generally, when multilevel image data of an input image is processed by using a binarizing process, a bi-level processed image is produced and a certain amount of image information contained in the input image is discarded after the binarizing process is completed. For this reason, the quality of a processed image which is stored after the binarizing process is completed or received from a transmitting station after it is stored will become lower than quality of the original image.

In order to prevent the quality of a processed image from deteriorating, a known binarizing process based on the error scattering method has been proposed. In the known binarizing process based on the error scattering method, a difference between the input image data density and the processed data density is divided by a given number of neighboring pixels adjacent to a target pixel, and the divided difference is added or scattered in equal proportions to the respective densities of the neighboring pixels. However, when the multilevel image data of an input image is processed by using the binarizing process based on the error scattering method, it is likely that a texture (undesired pattern) appears in the bi-level processed image.

In order to eliminate the undesired pattern from the bi-level processed image, several improved image processing methods have been proposed. For example, Japanese Laid-Open Patent Publication No. 62-239666 discloses an improved image processing method.

In the improved image processing method disclosed in the above mentioned publication, a periodically changing coefficient read from a matrix pattern is added to the multilevel image data relating to one pixel of input image prior to the binarizing process, in order to eliminate the undesired pattern from the bi-level processed image. However, the coefficients of the matrix pattern are fixed and cannot be adjusted. If the manner in which the coefficients of the matrix pattern periodically change does not match the resolution at which the processed image is printed by a printing unit or does not match the type of printing used by a printing unit that prints the processed image, it is likely that the image quality of a printed image will deteriorate even when the improved image processing method is performed.

SUMMARY OF THE INVENTION

Accordingly, it is a general object of the present invention to provide an improved image processing apparatus in which the above described problems are eliminated.

Another, more specific object of the present invention is to provide an image processing apparatus in which a multilevel image data of an image is processed by using the binarizing process based on the error scattering method, so that a bi-level processed image suitable for a predetermined printing characteristic of a printing unit for printing the bi-level processed image can be produced.

The above mentioned objects of the present invention can be achieved by an image processing apparatus for processing a multilevel image data of an image to produce a bi-level processed image, which apparatus includes: a reading part for reading an image by raster scanning of a document and for producing a multilevel image data relating to one pixel of the image; a memory part for storing a plurality of predetermined weight matrix patterns, each weight matrix pattern having $N \times N$ weight coefficients arranged in an $N \times N$ formation; a selecting part for selecting one of the plurality of predetermined weight matrix patterns stored in the memory part based on a printing characteristic of a printing unit that prints a bi-level processed image; a processing part coupled to the reading part and the memory part for adding a weight coefficient read from the selected weight matrix pattern to the multilevel image data relating to one pixel from the reading part, so that a weighted multilevel image data is produced; and a binarizing part for processing the weighted multilevel image data output from the processing part by using the binarizing process based on the error scattering method to produce a bi-level signal relating to one dot of a processed image, and for supplying the bi-level signal to the printing unit to print the processed image.

According to the present invention, it is possible to eliminate the undesired pattern from the bi-level processed image when the multilevel image data of the input image is processed by using the binarizing process based on the error scattering method, so that a high-quality image can be printed by either a printing unit of a facsimile system or a printing unit of a receiving facsimile station.

BRIEF DESCRIPTION OF THE DRAWINGS

Other objects, features and advantages of the present invention will become apparent from the following detailed description when read in conjunction with the accompanying drawings in which:

FIGS. 3A and 3B are diagrams showing examples of weighted patterns produced by adding weights read from a weight matrix pattern to an image;

FIG. 4 is a chart showing another weight matrix pattern used by a first embodiment of the present invention;

FIGS. 7A through 7D are charts showing a plurality of predetermined threshold matrix patterns for use in the binarizing process;

FIGS. 8A and 8B are diagrams showing weighted patterns produced by adding thresholds read from a threshold matrix pattern to an image;

FIG. 9 is a chart showing another threshold matrix pattern for use in the binarizing process.

DESCRIPTION OF THE PREFERRED EMBODIMENTS

Figures 1, 2A, 2B, 2C, 2D:
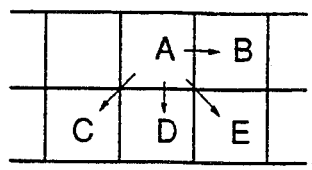
FIG. 1 is a diagram for explaining a known binarizing process based on the error scattering method.
FIGS. 2A through 2D are charts showing a plurality of predetermined weight matrix patterns.

A description will now be given of a known binarizing process based on the error scattering method, with reference to FIG. 1. When a binarizing process is performed by an image processing apparatus, multilevel image data of an input image produced by raster scanning of a document is converted into a bi-level signal. For example, when a multilevel image data of the input image relating to the pixel of interest indicated by "A" in FIG. 1 is processed by using the binarizing process, a bi-level signal relating to the pixel "A" is output with a processed density level. A difference between the density of the input image data and the density of the processed image data relating to the pixel A is then determined. When the binarizing process based on the error scattering method is performed, a difference between the input image data density and the processed data density is divided by a given number of neighboring pixels "B", "C", "D" and "E" (four pixels in this example) adjacent to the pixel "A" of interest in FIG. 1, and the divided difference is added in equal proportions to the respective densities of the neighboring pixels, in order to prevent the processed image from deteriorating.

The known error scattering method can be explained by the following equations:

$$f'(x\ y) = f(x\ y) + (1/\Sigma a(i\ j))\Sigma a(i\ j)e(x + i\ y + j)$$
$$e(x\ y) = f'(x\ y) - B \quad \text{if } f'(x\ y) \geq T$$
$$e(x\ y) = f'(x\ y) \quad \text{if } f'(x\ y) < T$$

where f(x y) is the multilevel image data of the input image, f'(x y) is the corrected multilevel image data of the processed image, a(i j) are the error scattering coefficients, T is the threshold value of the binarizing process, and B is the black dot level or the maximum density level.

When an image is recorded in accordance with the bi-level signal produced by using the binarizing process based on the error scattering method, the resolution and tone production of a recorded image will be improved, but it is likely that an undesired pattern appears in the recorded image, and therefore the image quality deteriorates.

In a G4 facsimile system, a plotter for printing a processed image is provided. There are two types of plotters used by the G4 facsimile system. The resolution or dot density at which an image is printed by one type of plotter is 200 dpi (dots per inch), and the resolution of the other type of plotter is 400 dpi. Generally, the resolution at which an image is printed by the plotter is the same as the resolution at which an input image is read by the scanner of the facsimile system.

There are several printing characteristics of plotters which are provided in facsimile systems. One plotter is a heat-sensitive printing unit and another plotter is an electrophotographic printing unit such as a laser beam printer. When an image read out and processed by using the binarizing process at a transmitting facsimile station is transmitted via a transmission line, the printing characteristic of the plotter of a receiving facsimile station may be one of several different printing characteristics.

In order to improve the image quality by eliminating the undesired pattern from a processed image, a plurality of predetermined weight matrix patterns are stored in a memory of the image processing apparatus of the present invention, and a suitable weight matrix pattern is selected from the plurality of weight matrix patterns in accordance with the printing characteristic of a plotter that prints the processed image.

FIGS. 2A through 2D show four weight matrix patterns MT1 through MT4, each of which has 4×4 weight coefficients arranged in a 4×4 matrix formation. These weight matrix patterns MT1 through MT4 are stored in a memory of an image processing apparatus (for example, a scanner unit of a facsimile system), and one of the weight matrix patterns is selected in accordance with the printing characteristic of the printing unit that prints a bi-level processed image.

For example, when the weight matrix pattern MT1 in FIG. 2A is selected, a weight read from the weight matrix pattern MT1 is repeatedly added to each pixel of an input image before the binarizing process is started, so that a periodically changing weighted pattern is produced. FIG. 3A shows the weighted pattern when the weight matrix pattern MT1 in FIG. 2A is selected. In this weighted pattern, a unit area RA consisting of eight pixels indicated by a solid line in FIG. 3A periodically appears in a concentrated manner. FIG. 3B shows the weighted pattern when the weight matrix pattern MT2 in FIG. 2B is selected. As in FIG. 3A, in the weighted pattern shown in FIG. 3B, a unit area RA consisting of eight pixels indicated by a solid line periodically appears in a concentrated manner.

The duration of the appearance of the area in a weighted pattern is hereinafter called the length of the weighted pattern, the length of the weighted pattern being relatively small when the weight matrix patterns MT1 and MT2 are selected and used in the binarizing process. On the other hand, the length of the weighted pattern is relatively large when the weight matrix patterns MT3 and MT4 are selected and used in the binarizing process. For example, when one of the weight matrix patterns MT3 and MT4 is selected, a unit area RA (not shown) consisting of sixteen pixels periodically appears the weighted pattern in a concentrated manner.

The values of the weights in the weight matrix patterns MT1 and MT3 range from −14 to +14, and the values of the weights in the weight matrix patterns MT2 and MT4 range from −7 to +7, as shown in FIGS. 2A through 2D. The range of the values of the weights in a weight matrix pattern is hereinafter called the amplitude of the weight matrix pattern. The amplitudes of the weight matrix patterns MT1 and MT3 are relatively large, while the amplitudes of the weight matrix patterns MT2 and MT4 are relatively small.

The weight matrix pattern MT1 in FIG. 2A has a relatively large amplitude and a relatively small length of the weighted pattern. The weight matrix pattern MT2 in FIG. 2B has a relatively small amplitude and a relatively small length of the weighted pattern. The weight matrix pattern MT3 in FIG. 2C has a relatively large amplitude and a relatively large length of the weighted pattern. The weight matrix pattern MT4 in FIG. 2D has a relatively small amplitude and a relatively large length of the weighted pattern.

In order to reproduce a high-quality image in which no undesired pattern appears, it is desirable to select a weight matrix pattern with a relatively small weighted pattern length when the plotter prints a processed image at a 200-dpi resolution and the scanner reads a document image at a 200-dpi resolution. On the other hand, it is desirable to select a weight matrix pattern with a relatively large weighted pattern length when the plotter prints a processed image at a 400-dpi resolution and the scanner reads a document image at a 400-dpi resolution.

It is desirable to select a weight matrix pattern with a relatively small amplitude when a heat-sensitive printing unit is used as the plotter, in order to reproduce a high-quality image in which the error scattering method is effectively performed. On the other hand, it is desirable to select a weight matrix pattern with a relatively large amplitude when an electrophotographic printing unit is used as the plotter, in order to reproduce a high-quality image in which dots are appropriately arranged in a concentrated manner.

In the image processing apparatus of the present invention, a suitable weight matrix pattern is selected from the plurality of predetermined weight matrix patterns in accordance with the printing characteristic of the plotter as follows.

For example, when the plotter is a 200-dpi heat-sensitive printing unit, the weight matrix pattern MT2 with a relatively small weighted pattern length and a relatively small amplitude is selected. When the plotter is a 400-dpi heat-sensitive printing unit, the weight matrix pattern MT4 with a relatively large weighted pattern length and a relatively small amplitude is selected. When the plotter is a 200-dpi electrophotographic printing unit, the weight matrix pattern MT1 with a relatively small weighted pattern length and a relatively large amplitude is selected. When the plotter is a 400-dpi electrophotographic printing unit, the weight matrix pattern MT4 with a relatively large weighted pattern length and a relatively large amplitude is selected.

When an image read by the scanner of a transmitting station (a G4 facsimile system) is transmitted to a receiving station via a transmission line, the printing characteristic of the plotter of the receiving station is uncertain. Thus, in such a case, it is predetermined to select a weight matrix pattern MT5 with a relatively large weighted pattern length and an intermediate amplitude. The weight matrix pattern MT5 is shown in FIG. 4.

Figure 5:
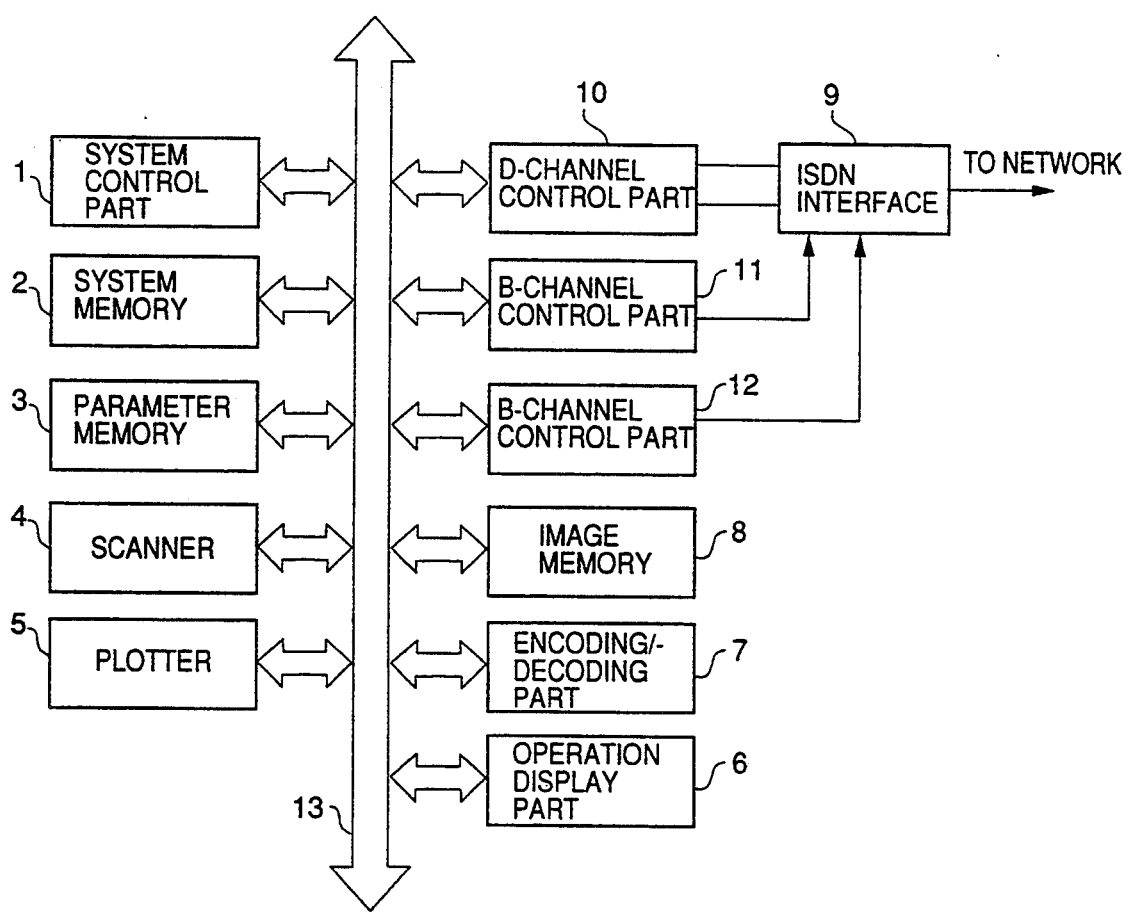
FIG. 5 is a block diagram showing a facsimile system to which the present invention is applied.

FIG. 5 shows a G4 facsimile system to which the present invention is applied. In FIG. 5, a system control part 1 is a main control unit of the facsimile system which controls operations of component units of the facsimile system. A system memory 2 stores programs and control data used to perform control procedures of the facsimile system. The system memory 2 forms the work area used by the system control part 1 when the control procedures of the facsimile system are performed. A parameter memory 3 stores a number of prescribed parameters used when the control procedures of the facsimile system are performed. The parameters stored in the parameter memory 3 include a plurality of facsimile identification numbers of receiving stations, and abbreviated codes of the facsimile identification numbers.

In FIG. 5, a scanner 4 optically reads a document image from a document either at the 200-dpi resolution or at the 400-dpi resolution. A plotter 5 prints a processed or received image on a recording medium at a prescribed recording resolution. An operation display part 6 is made up of a display unit and a set of operation keys. Instructions input by an operator by depressing the operation keys, a facsimile identification number of a called station and the like can be seen on the display unit.

In the G4 facsimile system shown in FIG. 5, one of a plurality of predetermined printing units is used as the plotter 5. The predetermined printing units include a 200-dpi heat-sensitive printing unit, a 400-dpi heat-sensitive printing unit, a 200-dpi electrophotographic printing unit, and a 400-dpi electrophotographic printing unit. One of these units is used as the plotter 5 for printing a process image on a recording medium.

An encoding/decoding part 7 compresses image information by encoding the image information, and decompresses image information by decoding the compressed image information into image information having its original form. An image memory 8 stores a plurality of encoded image information items to be transmitted or recorded. An ISDN (integrated services digital network) interface circuit 9 is provided to connect the G4 facsimile system to an ISDN network. The ISDN interface circuit 9 is capable of a layer-1 signal processing, and is capable of unifying and separating of signals on the D channel and data signals on the two B channels. A D-channel transmitting control part 10 is provided to perform known D-channel signal processing procedures such as call setting and call releasing procedures. B-channel transmitting control parts 11 and 12 are provided to perform a known G4 facsimile data transmission procedure on the B channels.

In the facsimile system shown in FIG. 5, the system control part 1, the system memory 2, the parameter memory 3, the scanner 4, the plotter 5, the operation display part 6, the encoding/decoding part 7, the image memory 8, the D-channel transmitting control part 10, and the B-channel transmitting parts 11, 12 are interconnected by a system bus 13. The transmitting and receiving of all the signals between any two component units within the facsimile system is made through the system bus 13.

Figure 6:
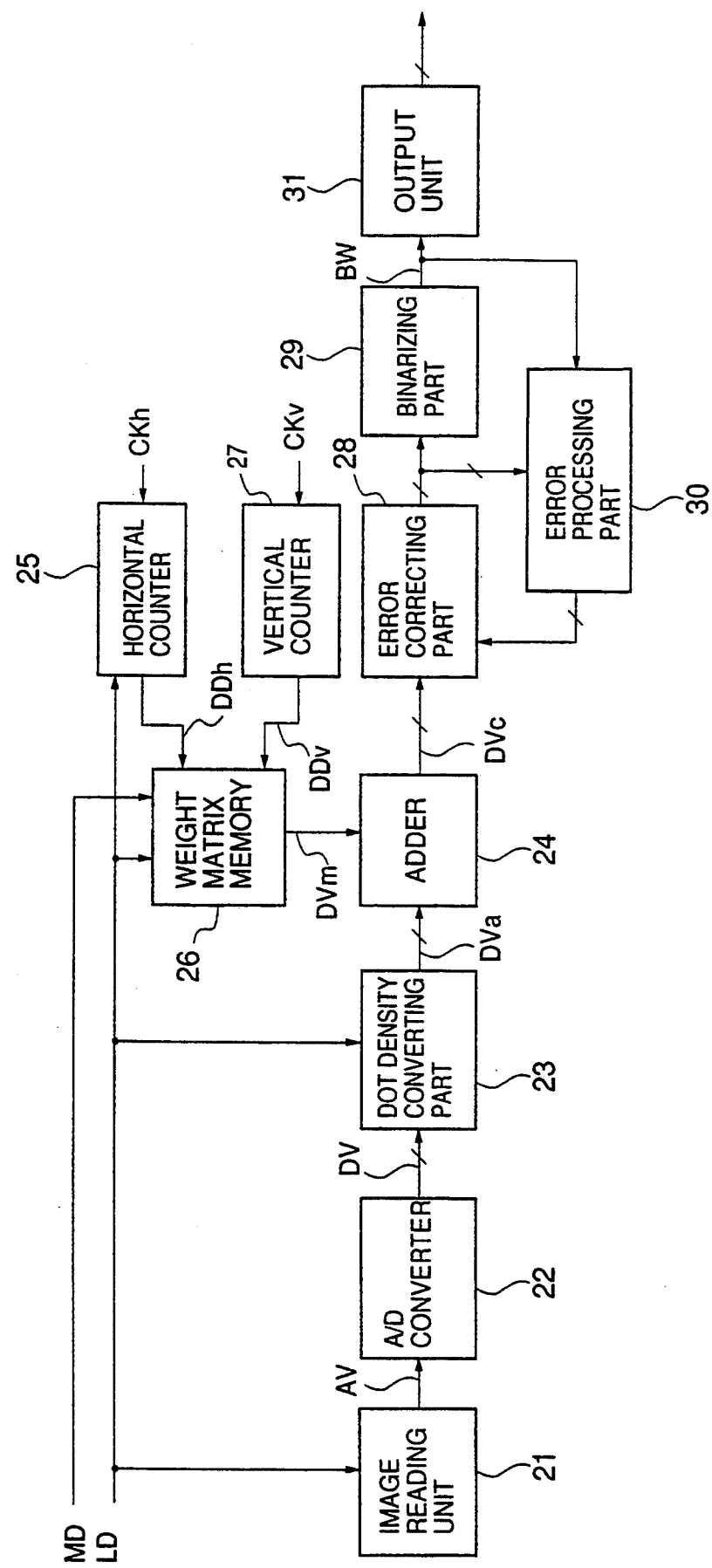
FIG. 6 is a block diagram showing a scanner unit of the facsimile system shown in FIG. 5 provided in the first embodiment.

FIG. 6 shows the scanner 4 of the facsimile system shown in FIG. 5, which is provided in the first embodiment of the present invention.

In FIG. 6, an image reading unit 21 optically reads an image by raster scanning of a document. The dot density of an image read by the image reading unit 21 is 400 dpi (dots per inch) of 200 dpi in a main scanning direction, and the line density of the image read by the image reading unit 21 is 400 lpi (lines per inch) or 200 lpi in a sub-scanning direction.

A resolution signal LD output from the system control part 1 in FIG. 5 is supplied to the image reading unit 21. The resolution signal LD indicates either a first value corresponding to 400 dpi or a second value corresponding to 200 dpi. One of a plurality of predetermined resolutions of the image reading unit 21 is selected in accordance with the resolution signal LD. For example, when the resolution signal LD indicating the first value corresponding to 400 dpi is supplied to the image reading unit 21, the 400-lpi line density is selected, and the image reading unit 21 reads an image with the 400-lpi line density in the sub-scanning direction. When the signal LD indicating the second value corresponding to 200 dpi is supplied to the image reading unit 21, the 200-lpi line density is selected, and the image reading unit 21 reads an image with the 200-lpi line density in the sub-scanning direction.

Based on the result of the document reading, the image reading unit 21 outputs an analog signal AV to an A/D (analog-to-digital) converter 22. The A/D converter 22 converts the analog signal AV into a digital signal DV. The digital signal DV output from the A/D converter 22 is supplied to a dot density converting part 23.

The resolution signal LD output by the system control part 1 is supplied to the dot density converting part 23. When the resolution signal LD indicating the second value corresponding to 200 dpi is supplied to the converting part 23, the dot density converting part 23 converts the digital signal DV (the dot density of the image being read is 400 dpi) output from the A/D converter 22 into a corrected digital signal DVa. The dot density of an image indicated by the corrected digital signal DVa is 200 dpi in the main scanning direction.

When the resolution signal LD indicating the first value corresponding to 400 dpi is supplied to the converting part 23, the dot density converting part 23 does not perform any dot-density conversion, and outputs the digital signal DV supplied from the A/D converter 22 as the corrected digital signal DVa. The dot density of an image indicated by this digital signal DVa is 400 dpi in the main scanning direction.

As shown in FIG. 6, the digital signal DVa output from the dot density converting part 23 is supplied to one input of an adder 24.

In addition, the resolution signal LD output from the system control part 1 is supplied to a horizontal counter 25. When the signal LD indicating the first value corresponding to 400 dpi is supplied to the counter 25, the horizontal counter 25 counts a horizontal clock Ckh which is generated in synchronism with the time at which an analog signal AV relating to one pixel is output by the image reading unit 21. On the other hand, when the resolution signal LD indicating the second value corresponding to 200 dpi is supplied to the counter 25, the horizontal counter 25 counts one of two horizontal clocks Ckh being generated for every two pixels. Based on the result of this counting, the horizontal counter 25 outputs a signal DDh indicating the count number to a weight matrix memory 26. The signal DDh output from the horizontal counter 25 is used to indicate a relative location (address) of a weight matrix pattern stored in the weight matrix memory 26 in the horizontal direction.

A vertical counter 27 counts a vertical clock Ckv which is generated in synchronism with the start time at which the image reading unit 21 starts reading of an image along one scanning line. Based on the result of this counting, the vertical counter 27 outputs a signal DDv indicating the count number to the weight matrix memory 26. The signal DDv output from the vertical counter 27 is used to indicate a relative location (address) of a weight matrix pattern stored in the weight matrix memory 26 in the vertical direction.

The plurality of predetermined weight matrix patterns MT1 through MT5 described above are stored in the weight matrix memory 26. A device type signal MD output from the system control part 1 is supplied to the weight matrix memory 26. The device type signal MD indicates one of first through third values in accordance with the device type of the plotter or a printing unit at which a processed image is printed. The resolution signal LD output from the system control part 1 is supplied to the weight matrix memory 26. One of the five predetermined weight matrix patterns MT1 through MT5 stored in the weight matrix memory 26 is selected in accordance with the device type signal MD and with the resolution signal LD.

Weight data is respectively read out from a selected weight matrix pattern of the weight matrix memory 26 based on the signals DDh and DDv supplied from the horizontal counter 25 and the vertical counter 27, respectively. As shown in FIG. 3, a weight signal DVm indicating the weight data read from the weight matrix memory 26 is supplied to the other input of the adder 24.

The device type signal MD output from the system control part 1 to the weight matrix memory 26 indicates a first value when the plotter 5 by which the processed image is printed is a heat-sensitive printing unit. The device type signal MD indicates a second value when the plotter 5 is an electrophotographic printing unit. The device type signal MD indicates a third value indicating the transmission mode when the printing unit by which the processed image is printed is a plotter of a receiving facsimile station.

When the device type signal MD indicating the first value (the heat-sensitive printing unit) and the resolution signal LD indicating the first value (400 dpi) are supplied to the weight matrix memory 26, the weight matrix pattern MT4 is selected from the plurality of weight matrix patterns MT1-MT5 stored in the memory 26, and the signal DVm indicating a weight read from the weight matrix pattern MT4 in the weight matrix memory 26 is output to the adder 24.

When the signal MD indicating the first value (the heat-sensitive printing unit) and the signal LD indicating the second value (200 dpi) are supplied to the memory 26, the weight matrix pattern MT2 is selected, and the signal DVm indicating a weight read from the weight matrix pattern MT2 in the weight matrix memory 26 is output to the adder 24.

When the signal MD indicating the second value (the electrophotographic printing unit) and the signal LD indicating the first value (400 dpi) are supplied to the memory 26, the weight matrix pattern MT3 is selected, and the signal DVm indicating a weight coefficient read from the weight matrix pattern MT3 is output to the adder 24.

When the signal MD indicating the second value (the electrophotographic printing unit) and the signal LD indicating the second value (200 dpi) are supplied to the memory 26, the weight matrix pattern MT1 is selected, and the signal DVm indicating a weight coefficient read from the weight matrix pattern MT1 is output to the adder 24.

When the signal MD indicating the third value (the transmission mode) is supplied to the memory 26, the weight matrix pattern MT5 is selected, and the signal DVm indicating a weight read from the weight matrix pattern MT5 is output to the adder 24.

The adder 24 shown in FIG. 6 adds the signal DVm indicating the weight output from the weight matrix memory 26 to the digital signal DVa indicating the image data output from the dot density converting part 23 (the image data relating to one pixel), and outputs a digital signal DVc indicating the weighted image data based on the result of this addition to an error correcting part 28.

In FIG. 6, the error correcting part 28, a binarizing part 29, and an error processing part 30 constitute an error scattering unit which performs the known binarizing process based on the error scattering method. The digital signal DVc indicating the weighted image data is supplied from the adder 24 to the error scattering unit, and a bi-level signal BW relating to one dot of the processed image is output by the binarizing part 29 to an output unit 31. The bi-level signal BW relating to one dot of the processed image is supplied from the output unit 31 to an external printing unit via the system bus 13 in FIG. 5. The external printing unit may be the plotter 5 of the facsimile system shown in FIG. 5 or a different printing unit of a receiving facsimile station to which the processed image (stored in the image memory 8) is transmitted by the facsimile system.

When the resolution signal LD indicating the first value (400 dpi) is supplied from the system control part 1, the digital signal DVa is output by the dot density converting part 23 to the adder 24 in synchronism with the outputting of the analog signal AV relating to one pixel from the image reading unit 21. The horizontal counter 25 counts the horizontal clock Ckh generated in synchronism with the outputting of the analog signal AV relating to one pixel from the image reading unit 21, and the counter 25 outputs the signal DDh indicating the count number to the weight matrix memory 26. Thus, the signal. DVm indicating the weight coefficient (read from the selected weight matrix pattern) output from the weight matrix memory 26 to the adder 24 corresponds to the digital signal DVa output from the dot density converting part 23 to the adder 24.

When the resolution signal LD indicating the second value (200 dpi) is supplied from the system control part 1, the digital signal DVa indicating the average of two digital signals DV supplied from the A/D converter 22 is output by the dot density converting part 23 to the adder 24 at a frequency that is half the frequency of the outputting of the analog signal AV relating to one pixel by the image reading unit 21. The horizontal counter 24 counts one of two horizontal clocks Ckh, and outputs the signal DDh indicating the count number to the weight matrix memory 26 at a frequency that is half the frequency of the outputting of the analog signal AV relating to one pixel by the image reading unit 21. Thus, the signal DVm indicating the weight output from the weight matrix memory 26 to the adder 24 always corresponds to the digital signal DVa output from the dot density converting part 23 to the adder 24.

In the above described first embodiment, the quality of a bi-level processed image is increased by adding periodically changing weights read from a selected weight matrix pattern to the image data before it is subjected to the binarizing process based on the error scattering method. The function of the first embodiment described above can also be achieved by assigning periodically changing thresholds read from a selected threshold matrix pattern, to the image data when the image data is subjected to the binarizing process based on the error scattering method.

Next, a description will be given of a second embodiment of the present invention, with reference to FIGS. 7A through 10.

FIGS. 7A through 7D show four threshold matrix patterns MR1 through MR4 each of which has 4×4 predetermined thresholds arranged in a 4×4 matrix formation for use in the binarizing process. These threshold matrix patterns MR1–MR4 are stored in a memory of the image processing apparatus, and one of the threshold matrix patterns is selected in accordance with the printing characteristic of the printing unit that prints a bi-level processed image.

When the weight matrix pattern MR1 in FIG. 7A is selected, a threshold read from the threshold matrix pattern MR1 is repeatedly added to each pixel of an input image during the binarizing process, so that a periodic weighted pattern is produced.

FIG. 8A shows the weighted pattern when the threshold matrix pattern MR1 in FIG. 7A is selected. FIG. 8B shows the weighted pattern when the threshold matrix pattern MR2 in FIG. 7B is selected. In the weighted pattern shown in FIG. 8A or 8B, a unit area RA consisting of eight pixels indicated by a solid line in FIG. 8A or 8B periodically appears in a concentrated manner.

The values of the thresholds in the threshold matrix patterns MR1 and MR3 range from 18 to 46, and the values of the thresholds in the threshold matrix patterns MR2 and MR4 range from 25 to 39, as shown in FIGS. 7A through 7D. Thus, the amplitudes of the threshold matrix patterns MR1 and MR3 are relatively large, while the amplitudes of the threshold matrix patterns MR2 and MR4 are relatively small.

The threshold matrix pattern MR1 in FIG. 7A has a relatively large amplitude and a relatively small weighted pattern length. The threshold matrix pattern MR2 in FIG. 7B has a relatively small amplitude and a relatively small weighted pattern length. The threshold matrix pattern MR3 in FIG. 7C has a relatively large amplitude and a relatively large weighted pattern length. The threshold matrix pattern MR4 in FIG. 2D has a relatively small amplitude and a relatively large weighted pattern length.

In order to reproduce a high-quality image in which no undesired pattern appears, in the second embodiment of the present invention, a suitable threshold matrix pattern is selected from the plurality of predetermined threshold matrix patterns in accordance with the printing characteristic of the printing unit as follows.

For example, when the printing unit (the plotter) is a 200-dpi heat-sensitive printing unit, the threshold matrix pattern MR2 with a relatively small weighted pattern length and a relatively small amplitude is selected. When the printing unit is a 400-dpi heat-sensitive printing unit, the weight matrix pattern MR4 with a relatively large weighted pattern length and a relatively small amplitude is selected. When the printing unit is a 200-dpi electrophotographic printing unit, the weight matrix pattern MR1 with a relatively small weighted pattern length and a relatively large amplitude is selected. When the printing unit is a 400-dpi electrophotographic printing unit, the weight matrix pattern MR3 with a relatively large weighted pattern length and a relatively large amplitude is selected.

Figure 9:
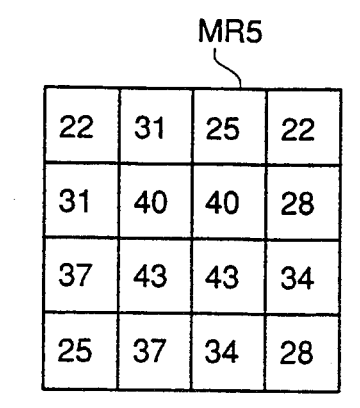

When a document image read by the scanner of a transmitting station (the G4 facsimile system) is transmitted to a receiving station via a transmission line, the printing characteristic of the printing unit at the receiving station is uncertain. In such a case, it is predetermined to select a threshold matrix pattern MR5 with a relatively large weighted pattern length and an intermediate amplitude. The threshold matrix pattern MR5 is shown in FIG. 9.

Figure 10:
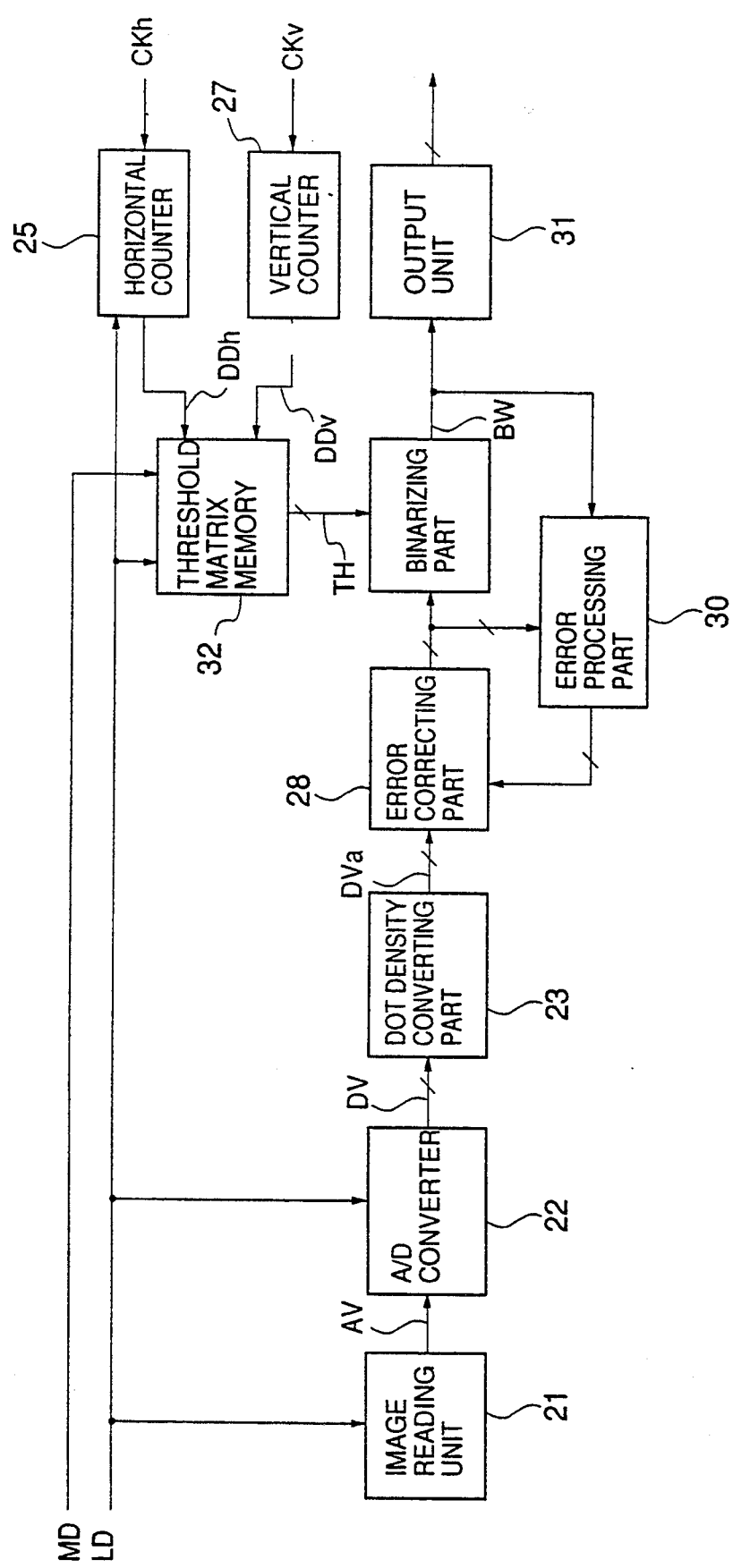
FIG. 10 is a block diagram showing an image processing apparatus provided in a second embodiment of the present invention.

FIG. 10 shows the second embodiment of the present invention which is applied to the scanner 4 of the facsimile system in FIG. 5. In FIG. 10, the parts which are the same as corresponding parts in FIG. 6 are designated by the same reference numerals, and a description thereof will be omitted.

In the image processing apparatus shown in FIG. 10, a threshold matrix memory 32 is provided, instead of the weight matrix memory 26 shown in FIG. 6. The plurality of predetermined threshold matrix patterns MR1 through MR5 described above are stored in the threshold matrix memory 32. Similarly to the weight matrix memory 26 in FIG. 6, the resolution signal LD and the device type signal MD output from the system control part 1 are supplied to the threshold matrix memory 32, so that one of the plurality of predetermined threshold matrix patterns MR1-MR5 is selected in accordance with these signals LD and MD.

The horizontal counter 25 and the vertical counter 27 are coupled to the threshold matrix pattern 32, and the signals DDh and DDv are supplied from the counters 25 and 27, respectively, to the threshold matrix memory 32, so that a threshold is read from a selected threshold matrix pattern of the threshold matrix memory 32 based on the signals DDh and DDv. A signal TH indicating the threshold read from the threshold matrix memory 32 is supplied to a binarizing part 33.

In the image processing apparatus shown in FIG. 10, the error correcting part 28, the error processing part 30 and the binarizing part 33 constitute an error scattering unit which performs the binarizing process based on the error scattering method. The binarizing part 33 subjects the image data output from the error correcting part 28 to the binarizing process by comparing the image data with the threshold indicated by the signal TH output from the threshold matrix memory 32. Based on the result of this comparison, the binarizing part 33 outputs a bi-level signal BW relating to one dot of the bi-level processed image to the output unit 31. The bi-level signal BW relating to one dot of the processed image is supplied from the output unit 31 to an external printing unit via the system bus 13 FIG. 5. The external printing unit may be the plotter 5 of the facsimile system in FIG. 5 or a different printing unit of a receiving facsimile station to which the processed image (stored in the image memory 8) is transmitted by the facsimile system in FIG. 5.

When the device type signal MD indicating the first value (the heat-sensitive printing unit) and the resolution signal LD indicating the first value (400 dpi) are supplied to the threshold matrix memory 32, the threshold matrix pattern MR4 is selected from the plurality of threshold matrix patterns MR1-MR5 stored in the threshold matrix memory 32. The signal TH indicating a threshold read from the threshold matrix pattern MR4 in the memory 32 based on the signals DDh and DDv output by the counters 25 and 27 is supplied to the binarizing part 33.

When the signal MD indicating the first value (the heat-sensitive printing unit) and the signal LD indicating the second value (200 dpi) are supplied to the memory 32, the threshold matrix pattern MR2 is selected. The signal TH indicating a threshold read from the threshold matrix pattern MR2 in the memory 32 based on the signals DDh and DDv output by the counters 25 and 27 is supplied to the binarizing part 33.

When the signal MD indicating the second value (the electrophotographic printing unit) and the signal LD indicating the first value (400 dpi) are supplied to the memory 32, the threshold matrix pattern MR3 is selected. The signal TH indicating a threshold read from the threshold matrix pattern MR3 in the memory 32 based on the signals DDh and DDv output by the counters 25 and 27 is supplied to the binarizing part 33.

When the signal MD indicating the second value (the electrophotographic printing unit) and the signal LD indicating the second value (200 dpi) are supplied to the memory 32, the threshold matrix pattern MR1 is selected. The signal TH indicating a threshold read from the threshold matrix pattern MR1 in the memory 32 based on the signals DDh and DDv output by the counters 25 and 27 is supplied to the binarizing part 33.

When the signal MD indicating the third value (the transmission mode) is supplied to the memory 32, the threshold matrix pattern MR5 is selected. The signal TH indicating a threshold read from the threshold matrix pattern MR5 in the memory 32 based on the signals DDh and DDv output by the counters 25 and 27 is supplied to the binarizing part 33.

In the above described embodiments, the present invention is applied to a G4 facsimile system. However, it is possible to apply the present invention to other image processing systems. The plurality of predetermined weight matrix patterns MT1-MT5 and the plurality of predetermined threshold matrix patterns MR1-MR5 are provided merely as examples, and a plurality of different matrix patterns can be used which are appropriate for an image processing system to which the present invention is applied.

Further, the present invention is not limited to the above described embodiments, and variations and modifications may be made without departing from the scope of the present invention.

What is claimed is:

1. An apparatus for processing multilevel image data of an image by using a binarizing process based on an error scattering method to produce a bi-level processed image suitable for a predetermined printing characteristic of a printing unit that prints the bi-level processed image, said apparatus comprising:

reading means for reading an image by raster scanning of a document and for producing multilevel image data relating to one pixel of said image;

memory means for storing a plurality of predetermined weight matrix patterns, each weight matrix pattern having N×N weight coefficients arranged in an N×N formation;

selecting means for selecting one of the plurality of predetermined weight matrix patterns stored in said memory means based on said printing characteristic of said printing unit;

processing means, coupled to said reading means and said memory means, for adding a weight coefficient read from said selected weight matrix pattern to said multilevel image data relating to one pixel from said reading means, so that a weighted multilevel image data is produced; and binarizing means for processing the weighted multilevel image data output from said processing means by using the binarizing process based on the error scattering method to produce a bi-level signal relating to one dot of a processed image, and for supplying the bi-level signal to the printing unit so that the processed image is printed by the printing unit in accordance with the bi-level signal;

wherein the printing characteristic of the printing unit is determined by a dot density of images printed by the printing unit.

2. An apparatus according to claim 1, wherein said image processing apparatus is provided within a scanner of a facsimile system and said printing unit is a plotter of the facsimile system.

3. An apparatus according to claim 1, wherein said image processing apparatus is provided within a scanner of a facsimile system, and said printing unit is a printing unit of another facsimile system to which an image is transmitted from said facsimile system.

4. The apparatus of claim 1, wherein said selecting means includes:
means for selecting a weight matrix pattern based on whether or not the printing unit is a heat-sensitive printing unit or an electrophotographic printing unit, and based on a resolution of the printing unit.

5. The apparatus of claim 1, wherein:
the plurality of predetermined weight matrix patterns stored in said memory means have mutually different durations of appearance of a weighted pattern of the weight coefficients.

6. The apparatus of claim 5, wherein said selecting means includes:
means for selecting a weight matrix pattern having a long duration when the printing unit has a high resolution and for selecting a weight matrix pattern having a short duration when the printing unit has a low resolution.

7. The apparatus of claim 1, wherein:
the plurality of predetermined weight matrix patterns stored in said memory means have mutually different ranges of values of weight coefficients.

8. The apparatus of claim 7, wherein said selecting means includes:
means for selecting a weight matrix pattern having a narrow range of values of the weight coefficients when the printing unit is a heat-sensitive printing unit, and for selecting a weight matrix pattern having a wide range of values of the weight coefficients when the printing unit is an electrophotographic printing unit.

9. An apparatus for processing multilevel image data of an image by using a binarizing process based on an error scattering method to produce a bi-level processed image suitable for a predetermined printing characteristic of a printing unit that prints the bi-level processed image, said apparatus comprising:
reading means for reading an image by raster scanning of a document and for producing multilevel image data relating to one pixel of said image;
memory means for storing a plurality of predetermined weight matrix patterns, each weight matrix pattern having N×N weight coefficients arranged in an N×N formation;
selecting means for selecting one of the plurality of predetermined weight matrix patterns stored in said memory means based on said printing characteristic of said printing unit;
processing means, coupled to said reading means and said memory means, for adding a weight coefficient read from said selected weight matrix pattern to said multilevel image data relating to one pixel from said reading means, so that a weighted multilevel image data is produced; and
binarizing means for processing the weighted multilevel image data output from said processing means by using the binarizing process based on the error scattering method to produce a bi-level signal relating to one dot of a processed image, and for supplying the bi-level signal to the printing unit so that the processed image is printed by the printing unit in accordance with the bi-level signal;
wherein the printing characteristic of the printing unit is predetermined by a combination of (1) a dot density of an image printed by the printing unit and (2) a type of printing performed by the printing unit.

10. The apparatus of claim 9, wherein the selecting means includes:
means for selecting a weight matrix pattern based on whether or not the printing unit is a heat-sensitive printing unit or an electrophotographic printing unit.

11. The apparatus of claim 9, wherein:
the plurality of predetermined weight matrix patterns stored in said memory means have mutually different durations of appearance of a weighted pattern of the weight coefficients.

12. The apparatus of claim 11, wherein said selecting means includes:
means for selecting a weight matrix pattern having a long duration when the printing unit has a high resolution and for selecting a weight matrix pattern having a short duration when the printing unit has a low resolution.

13. The apparatus of claim 9, wherein:
the plurality of predetermined weight matrix patterns stored in said memory means have mutually different ranges of values of weight coefficients.

14. The apparatus of claim 13, wherein said selecting means includes:
means for selecting a weight matrix pattern having a narrow range of values of the weight coefficients when the printing unit is a heat-sensitive printing unit, and for selecting a weight matrix pattern having a wide range of values of the weight coefficients when the printing unit is an electrophotographic printing unit.

15. An apparatus for processing multilevel image data of an image by using a binarizing process based on an error scattering method to produce a bi-level processed image suitable for a predetermined printing characteristic of a printing unit that prints the bi-level processed image, said apparatus comprising:
reading means for reading an image by raster scanning of a document, and for producing multilevel image data relating to one pixel of said image;
memory means for storing a plurality of predetermined threshold matrix patterns, each threshold matrix pattern having N×N thresholds arranged in an N×N formation, each threshold being retrievable from one of the plurality of predetermined threshold matrix patterns by supplying address signals indicating two-dimensional locations of the threshold within the threshold matrix pattern to said memory means;
selecting means for selecting one of the plurality of predetermined threshold matrix patterns stored in said memory means based on said printing characteristic of said printing unit;
synchronizing means for supplying address signals to said memory means in synchronism with the outputting of a multilevel image data relating to one pixel of the image from said reading means; and
binarizing means, coupled to said memory means and said image reading means, for comparing the multilevel image data relating to one pixel of the image, output from said reading means, with a threshold read from a selected threshold matrix pattern and said memory means based on the address signals output from said synchronizing means, and for producing a bi-level signal relating to one dot of a processed image based on the result of the comparison so that the processed image is printed by the printing unit in accordance with the bi-level signal;

wherein the printing characteristic of the printing unit is determined by a dot density of an image printed by the printing unit.

16. The apparatus of claim 15, wherein said selecting means includes:

means for selecting a weight matrix pattern based on whether or not the printing unit is a heat-sensitive printing unit or an electrophotographic printing unit, and based on a resolution of the printing unit.

17. The apparatus of claim 15, wherein:

the plurality of predetermined threshold matrix patterns stored in said memory means have mutually different durations of appearance of a threshold pattern.

18. The apparatus of claim 17, wherein said selecting means includes:

means for selecting a threshold matrix pattern having a long duration when the printing unit has a high resolution, and for selecting a threshold matrix pattern having a short duration when the printing unit has a low resolution.

19. The apparatus of claim 15, wherein:

the plurality of predetermined threshold matrix patterns stored in said memory means have mutually different ranges of values of the thresholds.

20. The apparatus of claim 19, wherein said selecting means includes:

means for selecting a threshold matrix pattern having a narrow range of values of the thresholds when the printing unit is a heat-sensitive printing unit, and for selecting a threshold matrix pattern having a wide range of values of the thresholds when the printing unit is an electrophotographic printing unit.

21. An apparatus for processing multilevel image data of an image by using a binarizing process based on an error scattering method to produce a bi-level processed image suitable for a predetermined printing characteristic of a printing unit that prints the bi-level processed image, said apparatus comprising:

reading means for reading an image by raster scanning of a document and for producing multilevel image data relating to one pixel of said image;

memory means for storing a plurality of predetermined weight matrix patterns, each weight matrix pattern having N×N weight coefficients arranged in an N×N formation;

selecting means for selecting one of the plurality of predetermined weight matrix patterns stored in said memory means based on said printing characteristic of said printing unit;

processing means, coupled to said reading means and said memory means, for adding a weight coefficient read from said selected weight matrix pattern to said multilevel image data relating to one pixel from said reading means, so that a weighted multilevel image data is produced; and binarizing means for processing the weighted multilevel image data output from said processing means by using the binarizing process based on the error scattering method to produce a bi-level signal relating to one dot of a processed image, and for supplying the bi-level signal to the printing unit so that the, processed image is printed by the printing unit in accordance with the bi-level signal;

wherein the printing characteristic of the printing unit is predetermined by a combination of a dot density of an image printed by the printing unit and a type of printing performed by the printing unit.

22. The apparatus of claim 21, wherein the selecting means includes:

means for selecting a weight matrix pattern based on whether or not the printing unit is a heat-sensitive printing unit or an electrophotographic printing unit.

23. The apparatus of claim 21, wherein:

the plurality of predetermined threshold matrix patterns stored in said memory means have mutually different durations of appearance of a threshold pattern.

24. The apparatus of claim 23, wherein said selecting means includes:

means for selecting a threshold matrix pattern having a long duration when the printing unit has a high resolution, and for selecting a threshold matrix pattern having a short duration when the printing unit has a low resolution.

25. The apparatus of claim 21, wherein:

the plurality of predetermined threshold matrix patterns stored in said memory means have mutually different ranges of values of the thresholds.

26. The apparatus of claim 25, wherein said selecting means includes:

means for selecting a threshold matrix pattern having a narrow range of values of the thresholds when the printing unit is a heat-sensitive printing unit, and for selecting a threshold matrix pattern having a wide range of values of the thresholds when the printing unit is an electrophotographic printing unit.

* * * * *